United States Patent
Fang et al.

(10) Patent No.: US 6,975,853 B2
(45) Date of Patent: Dec. 13, 2005

(54) PERSONAL IDENTIFICATION DEVICE FOR MOBILE TELEPHONE

(75) Inventors: George Fang, Cambridge, MA (US); Giovanni Vannucci, Red Bank, NJ (US); Jinyun Zhang, New Providence, NJ (US); Tommy C. Poon, Murray Hill, NJ (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 313 days.

(21) Appl. No.: 10/364,146

(22) Filed: Feb. 11, 2003

(65) Prior Publication Data

US 2004/0077375 A1 Apr. 22, 2004

Related U.S. Application Data

(63) Continuation-in-part of application No. 10/277,709, filed on Oct. 22, 2002.

(51) Int. Cl.[7] ............................ H04M 1/66; H04M 1/68; H04M 3/16
(52) U.S. Cl. .................... 455/411; 455/411; 455/556.1; 455/569.1; 455/410; 455/559; 455/558
(58) Field of Search .................... 455/410, 409, 455/411, 550.1, 556.1, 558, 559, 569.1

(56) References Cited

U.S. PATENT DOCUMENTS

| 5,487,182 | A |   | 1/1996  | Hansson ...................... 455/90 |
| 5,649,296 | A |   | 7/1997  | MacLellan et al. ......... 455/38.2 |
| 5,740,165 | A |   | 4/1998  | Vannucci .................... 370/330 |
| 6,052,576 | A | * | 4/2000  | Lambourg .................. 455/410 |
| 6,072,792 | A |   | 6/2000  | Mazur et al. ............... 370/345 |
| 6,130,623 | A |   | 10/2000 | MacLellan et al. .... 340/825.54 |
| 6,192,255 | B1 | * | 2/2001 | Lewis et al. ................ 455/558 |

* cited by examiner

*Primary Examiner*—Sonny Trinh
*Assistant Examiner*—Dung Lam
(74) *Attorney, Agent, or Firm*—Dirk Brinkman; Andrew J. Curtin (57) ABSTRACT

A personal identification device for use with a mobile telephone in a wireless communications network includes an connector mated to a connector of the mobile telephone normally used for a hands-free kit or a data port. In a typical application, a user of the mobile telephone calls a server. The server sends a first telephone signal to the personal identification device. The device responds with a second telephone signal, designed to simulate voice or data activity, depending on the type of connector that is used. The simulated voice activity is structured in such a way as to cause the radio signal transmitted by the mobile telephone to go on and off in response to the simulated voice activity. A nearby receiver can detect the on/off pattern. The on/off pattern is designed to convey a unique identification code.

13 Claims, 7 Drawing Sheets

PERSONAL IDENTIFICATION DEVICE FOR MOBILE TELEPHONE

RELATED APPLICATION

This application is a continuation-in-part of U.S. patent application Ser. No. 10/277,709, "Mobile Telephone Messaging by Baseband Envelope Modulation," filed on Oct. 22, 2002.

FIELD OF THE INVENTION

This invention relates generally to wireless communications systems, and more particularly to locating and identifying a mobile telephone.

BACKGROUND OF THE INVENTION

Figure 1:
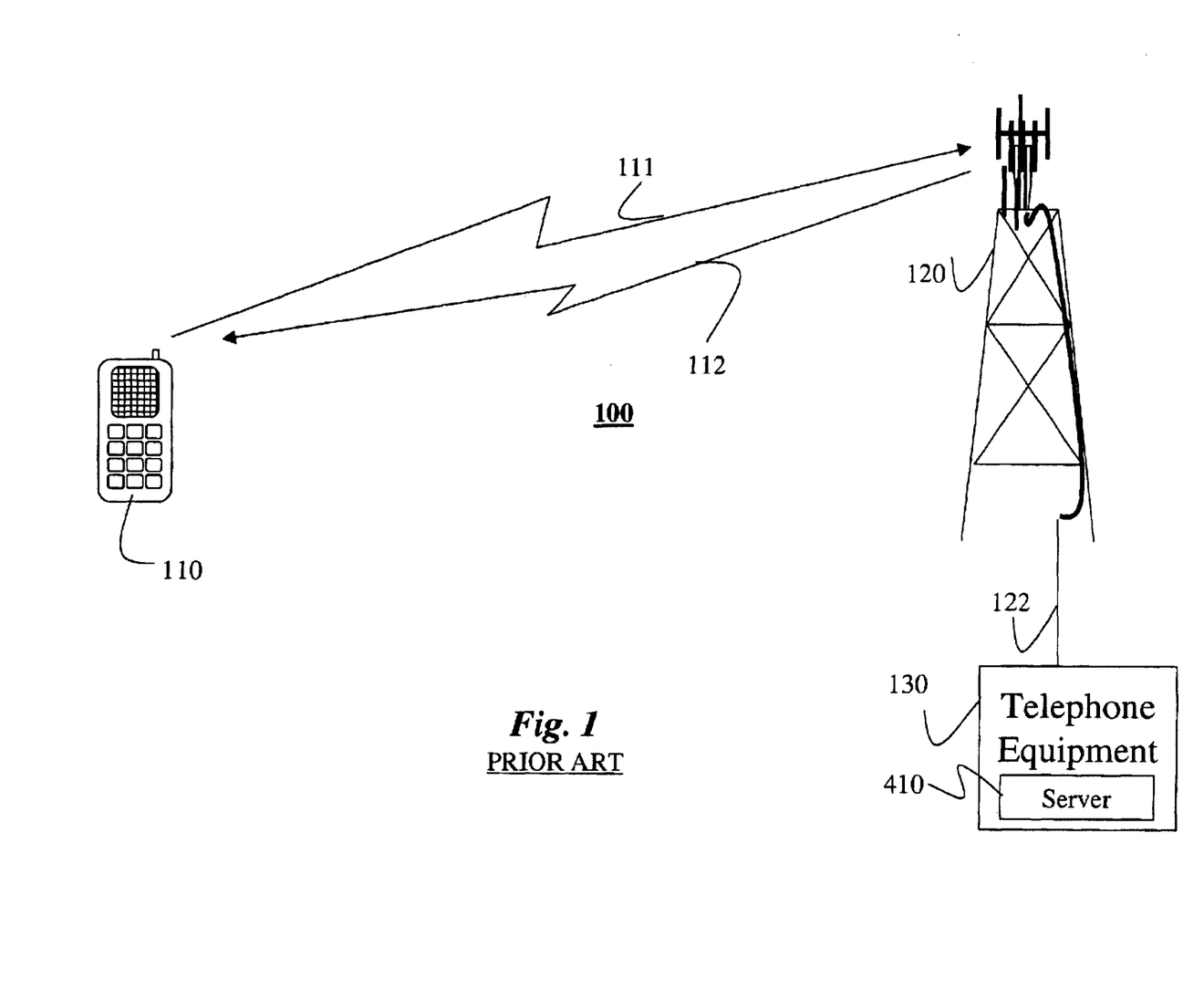
FIG. 1 is a block diagram of a conventional mobile communications network that uses the device according to the invention.

Mobile telephones are widely used because of their ability to communicate at a variety of locations. FIG. 1 depicts a typical prior art mobile telephone communication system 100. The system comprises a mobile telephone 110, which transmits an uplink radio signal 111 to a base station 120. The base station 120 transmits a downlink radio signal 112 to the mobile telephone. The base station 120 is also connected to a telephone equipment 130 through a connection 122, which is usually part of the public switched telephone network (PSTN). The telephone equipment 130 can include other telephones, automated answering units or a modem connected to a computer, and a server 410. The system 100 provides a point-to-point two-way connection between the mobile telephone 110 and the telephone equipment 130.

Figure 2:
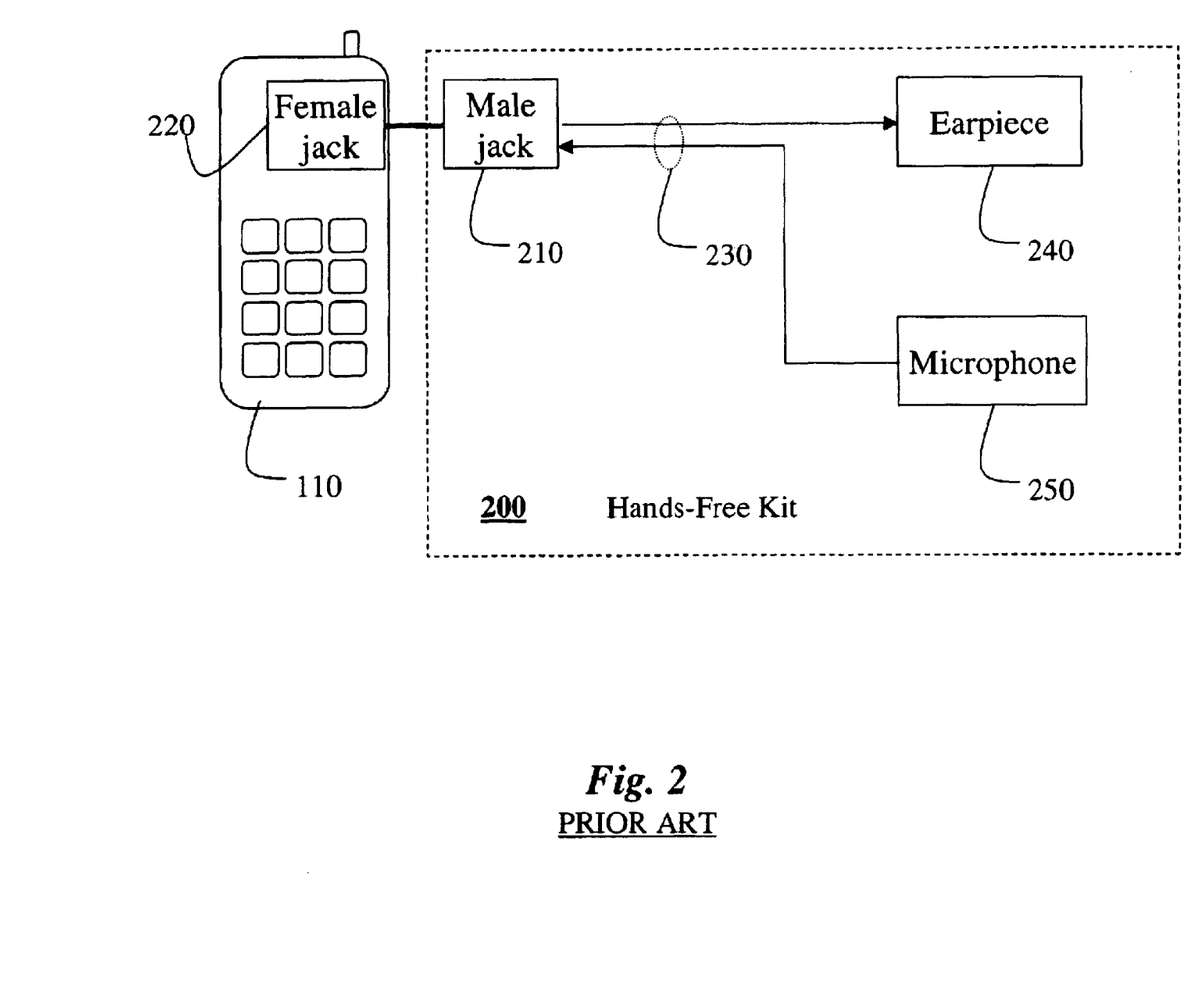
FIG. 2 is a block diagram of a prior art hands-free kit.

A frequently-used accessory for mobile telephones is a hands-free kit (HFK). FIG. 2 depicts a typical prior-art HFK 200 used in conjunction with the mobile telephone 110. The kit includes a male jack 210, which is coupled to a female jack 220 attached to a housing of the mobile telephone 110. The HFK 200 further includes a cable 230 and an earpiece 240. The earpiece 240 is coupled to the cable 230 and is adapted to generate an audible sound signal in response to an electrical signal received from the mobile telephone 110 through the male jack 210 and the female jack 220 and the cable 230.

The HFK 200 further includes a microphone 250. The microphone 250 is also coupled to the cable 230 and is adapted to generate an electrical signal in response to a detected sound signal. The signal generated by the microphone 250 is conveyed to the mobile telephone 110 through the cable 230 and the male jack 220 and the female jack 210. As an advantage, the user of a mobile telephone can wear the HFK 200, thus freeing the user's hands to perform other tasks.

As described in the related application, the mobile telephone 110 can use simulated voice activity to communicate wirelessly with a receiver that detects an envelope of the radio transmission. It would be advantageous to generate such simulated voice activity without modifying existing mobile telephones. A typical application for this communication technique locates, identifies, or authenticates the mobile telephone.

This application is typically realized through a connection to an authentication server 410 connected to the telephone equipment 130. It would also be advantageous to realize such a connection without having to modify existing mobile telephones, wireless networks, and wireless communications air interface standards.

It is desired to provide an external device for a mobile telephone so that the mobile telephone is enabled for the functionality described above, without requiring modifications to the mobile telephone.

SUMMARY OF THE INVENTION

The present invention provides a device that can be plugged into a jack of a mobile telephone in a similar manner as a hands-free kit. The device receives a first telephone signal from the mobile telephone via the jack. However, instead of producing a sound in an earpiece, as in a conventional hands-free kit, the device according to the invention extracts a first message encoded in the first telephone signal.

Based on the contents of the encoded message, the device generates a second telephone signal, which is supplied to the mobile telephone through the jack in the same manner as a conventional hands-free kit delivers a signal obtained from a microphone. The inventive device is referred to as a personal identification device.

When the device is connected to the mobile telephone, the mobile telephone can be used as a wireless personal identifier through the use of simulated telephone activity to transmit a second message to a receiver. The second message is likewise encoded in a second radio signal transmitted by the mobile telephone in response to the simulated telephone activity. The receiver detects the envelope of the radio transmission from the mobile telephone.

In a typical application, the mobile telephone user inserts the personal identification device into the jack of a conventional mobile telephone. Then, the mobile telephone user places a telephone call to a server. In response, the server replies a with first message encoded as the first telephone signal. The personal identification device detects the first message, and generates a second telephone signal encoding a second message by means of simulated telephone activity. The personal identification device feeds the second telephone signal into the mobile telephone through the jack. The simulated telephone activity causes the mobile telephone to transmit a radio signal with a pattern that corresponds to simulated telephone activity. An envelope detector located near the mobile telephone detects the radio signal pattern and, thereby, detects the presence of the mobile telephone and an identity of the mobile telephone user as encoded in the second message.

DETAILED DESCRIPTION OF THE PREFERRED EMBODIMENT

Device Structure

Figure 3:
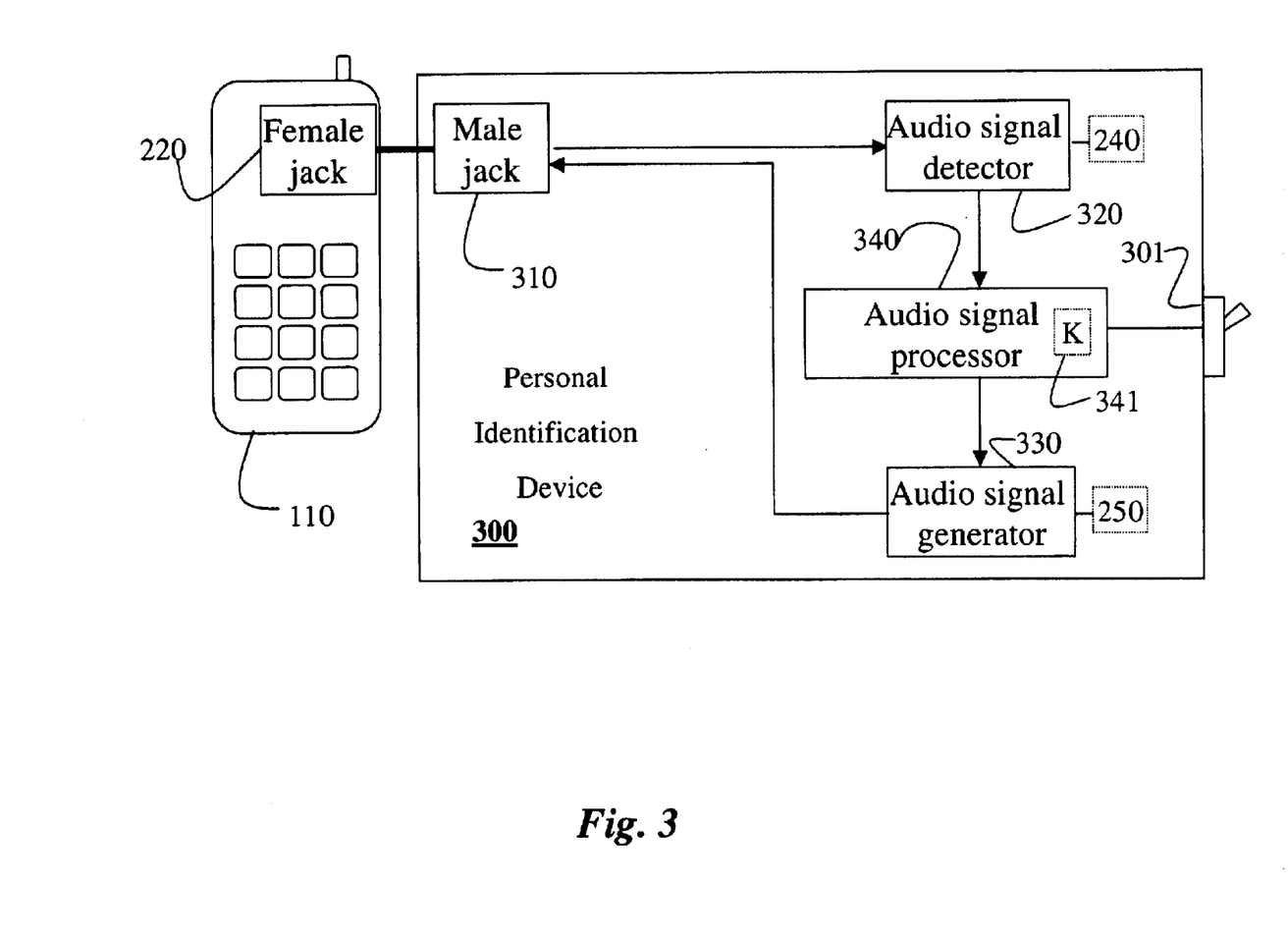
FIG. 3 is a block diagram of a personal identification device according to the invention using a voice telephone signal.

FIG. 3 shows a personal identification device (PID) 300 according to the invention. The PID 300 includes a male jack 310, an audio telephone signal detector 320, an audio telephone signal generator 330, and an audio telephone signal processor 340. The input to the detector and the output from the generator are connected to the jack, and the processor is connected between the detector and the generator.

Optionally, the PID 300 can also include an earpiece 240 and a microphone 250 to allow the mobile telephone user to switch between hands free-kit operation and personal-identification-device operation as described below. An optional switch 301 can be used to select these between two modes of operation, or to control the operation of the device in other ways.

Device Operation

During operation, the PID 300 is connected to a female jack 220 of a conventional mobile telephone 110. The audio telephone signal detector 320 is adapted to receive a first audio telephone signal produced by the mobile telephone and intended for the earpiece 240. The audio telephone signal generator 330 is adapted to generate a second audio telephone signal with intensity and spectrum similar to an electrical signal produced by the microphone 250. The detected and generated telephone signals are similar to the voice signals normally processed by the mobile telephone 110.

In a simple implementation, the audio signal processor may be omitted, such that the detected signal is passed directly to the signal generator 330 without modification. Alternatively, the audio signal processor 340 is adapted to provide signal-level adjustment, analog signal processing, digital signal processing or other enhanced functions for the personal identification device 300.

Figure 4:
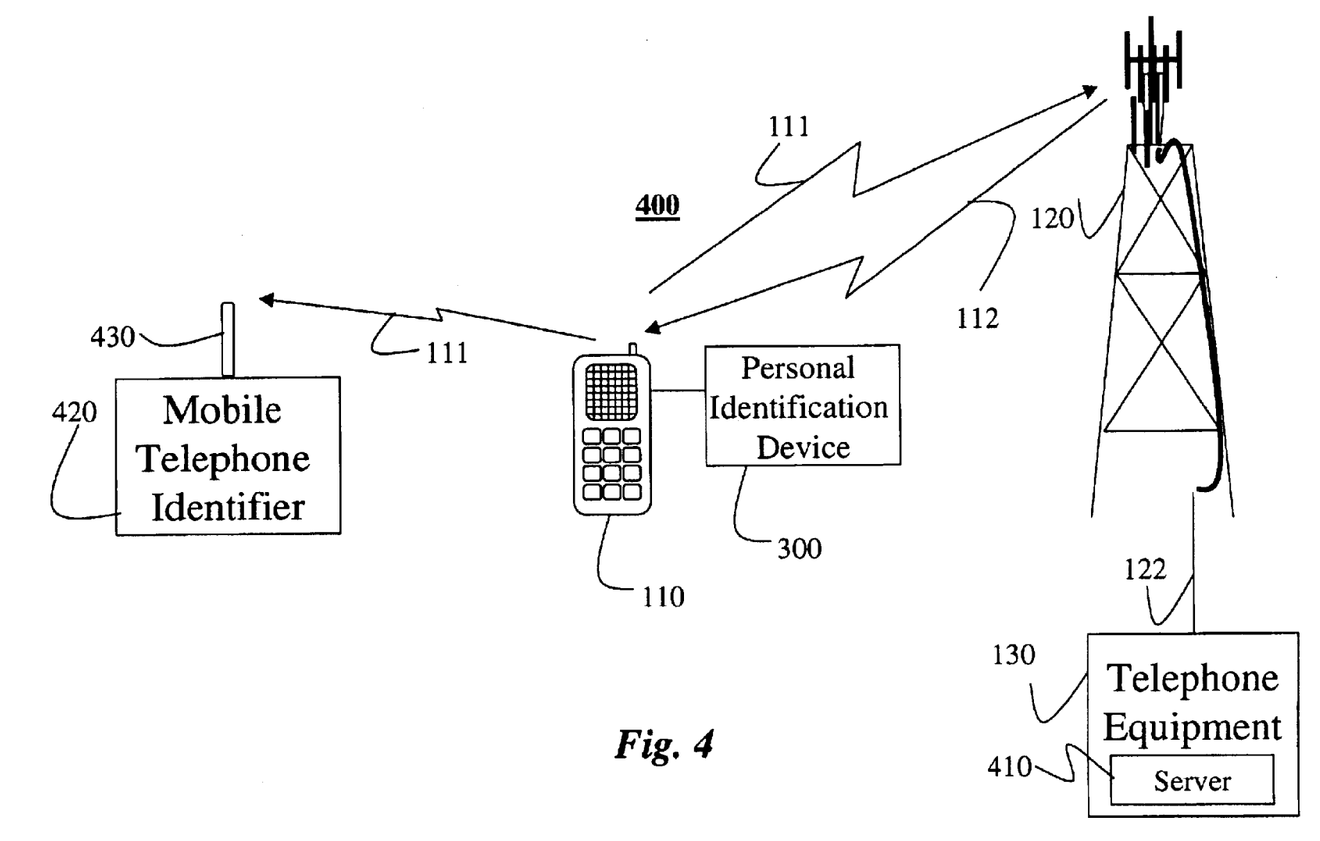
FIG. 4 is a block diagram of a mobile communications system using the device of FIG. 3.

As shown in FIG. 4 for a preferred embodiment of this invention, the user of the mobile telephone 110 places a telephone call to the telephone equipment 130 containing a server 410. The server 410 is capable of generating an audio telephone signal containing a first message. The first message can be encoded into an audio telephone signal through any of a variety techniques well known in the art, for example the telephone signal can be a series of dual-tone multi-frequency (DTMF) codes—also known as touch tones—commonly used for dialing telephone numbers.

Alternatively, the message can be encoded by frequency modulating an audio carrier through a technique known as frequency-shift keying (FSK). The audio signal travels over the downlink radio signal 112 to the mobile telephone 110, where it is made available out of the female jack 220.

The audio telephone signal detector 320 receives the audio telephone signal from the jack and conditions it for the signal processor 340. The signal processor 340 extracts the encoded first message from the audio telephone signal and produces a second telephone signal with simulated voice activity that encodes a second message. The second telephone signal is passed to the audio signal generator 330 that converts it into an audio telephone signal of the appropriate amplitude and impedance so that the mobile telephone 110 accepts the telephone signal as if it had been produced by the microphone 250.

In a simple implementation the audio signal detector can be an attenuator or it can be omitted. Similarly, the audio signal generator can also be an attenuator or it can be omitted. Indeed, in the simplest implementation, the entire function of the personal identification device 300 may be a simple pass-through with, perhaps, just an impedance adapter. In such an implementation, the server 410 generates an audio signal that already contains simulated voice activity. In this case, the signal is simply transferred from the output of the female jack 220 to the input of the same jack for the purpose of making the mobile telephone 110 transmit the simulated voice activity generated by the server.

The simulated voice activity in the telephone signal produced by the audio signal generator causes the mobile telephone 110 to produce a corresponding transmitted radio signal whose envelope changes in a pattern responsive to the simulated voice activity. The pattern can simply be an on/off of the radio signal to encode the second message. The primary function of the audio signal processor is to generate such a pattern, which can be detected by an appropriate receiver. However, the audio signal processor can also prepare a third audio telephone signal intended for the server 410. For example, the third signal may include a confirmation that the simulated voice activity was generated successfully. The third audio signal reaches the server 410 via the uplink radio signal 111.

For enhanced security, the audio signal processor 340 can include an encryption module (K) 341 as is known in the art. Additionally, the personal identification device 300 can communicate a unique device identification number to the server 410 to achieve accurate identification of the device. The identity of the user can be further verified by requiring the user to enter a personal identification number with the mobile telephone keypad; the keypad activity can be detected through DTMF codes in well-known fashion by the audio signal processor 340 or by the server 410 or both. Voice recognition techniques can also be used. To further aid in identification of the user, "caller-ID" information, provided by the telephone network, can be made available to the server.

The mobile communications system 400 can include a mobile telephone identifier (MTI) 420 equipped with a receiving antenna 430. The MTI is adapted to detect the reverse-link radio signal 111 from the mobile telephone 110 and further adapted to detect the pattern of envelope changes in the radio transmission. The envelope changes can be effected by on/off keying of the telephone signal.

Figure 5:
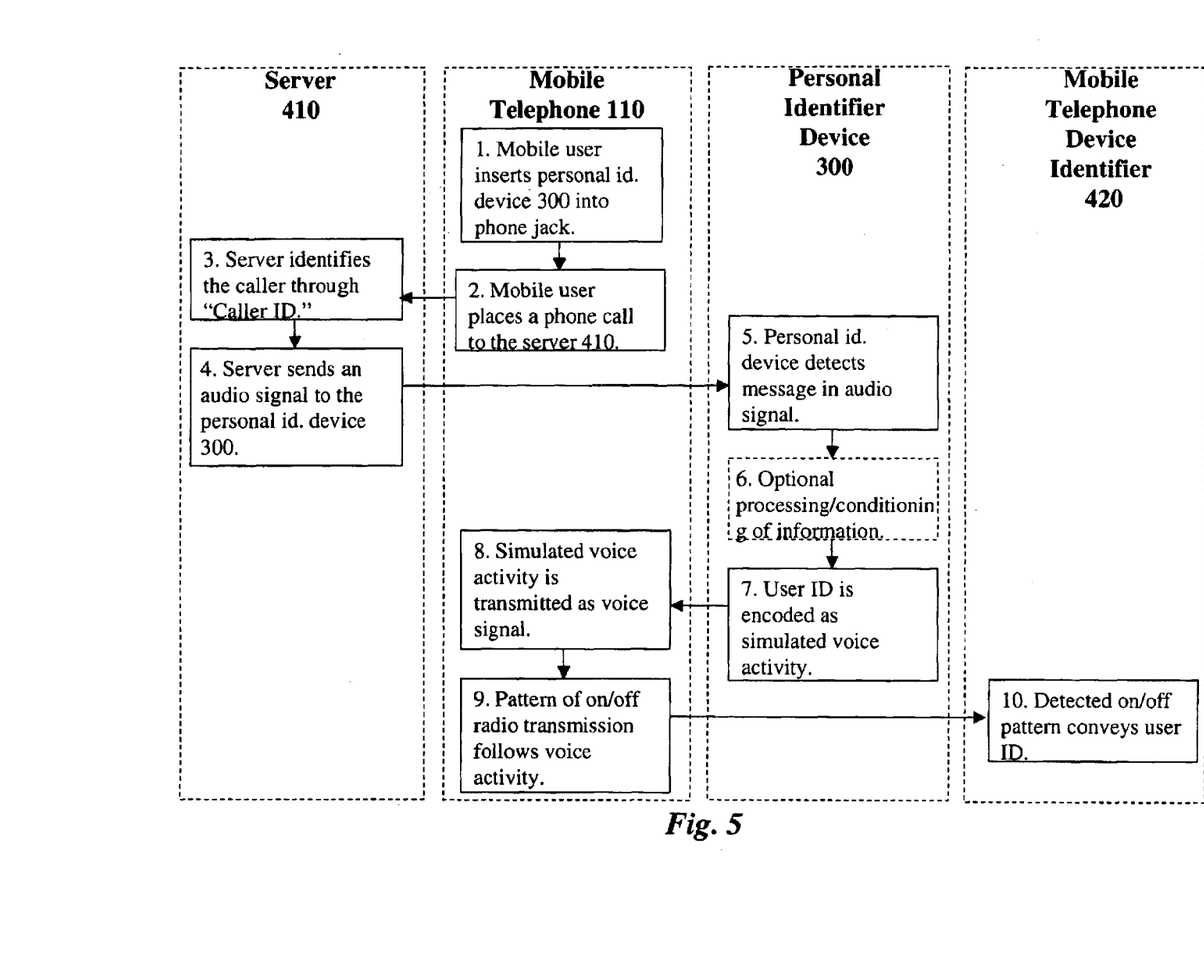
FIG. 5 is a flow diagram of operations of the system of FIG. 4.

FIG. 5 shows the steps of a method for identifying a mobile telephone user according to the invention. The steps are grouped in four columns corresponding to the functions performed by the server 410, the mobile telephone 110, the personal identification device 300, and the mobile telephone identifier 420.

In step 1, the user of the mobile telephone 110 inserts the male jack 310 of the personal identification device 300 into the female jack 220 of the mobile telephone 110.

In step 2, the user places a wireless voice telephone call to the server 410.

In step 3, the server 410 receives the incoming telephone call and obtains "caller ID" information provided by a telephone service provider. The server processes the "caller ID" information for the purpose of identifying the user of the mobile telephone 110.

In step 4, after identifying the caller, the server answers the incoming telephone call and generates the first audio telephone signal containing the first message in a format usable by the personal identification device 300.

In step 5, the personal identification device 300 receives the first audio telephone signal and detects the first message.

In optional step 6, the personal identification device processes the first message through any of a variety of digital or analog techniques well known in the art. If useful for additional security or other purposes, the personal identification device can collect additional information from the mobile telephone user by detecting DTMF signals generated by the keypad or through voice recognition. Additionally, the personal identification device 300 can communicate with the server 410 through the third audio telephone signal to provide information to the server or request additional information from the server.

In step 7, the personal identification device generates the second audio telephone signal in response to the first message. The second audio telephone signal contains the second message encoded as simulated voice activity. The second message conveys the identity of the mobile telephone user as determined by the server 410.

In step 8, the mobile telephone receives the second audio telephone signal through the female audio jack 220. The mobile telephone accepts the second audio telephone signal as if it had been generated by the microphone 250.

In step 9, the simulated voice activity contained in the second audio telephone signal causes the mobile telephone 110 to transmit the uplink radio signal 111 in the pattern of envelope changes according to the simulated voice activity. The pattern can be a pattern of on/off keying of the radio signal.

In step 10, the mobile telephone identifier 420 receives the uplink radio signal 111, detects the envelope pattern and, thereby, decodes the associated second message. From the contents of the second message, the mobile telephone identifier learns the identity of the mobile telephone user. This message can then be used to authorize a commercial transaction.

Integrated Personal Identification Device and Method

Figure 6:
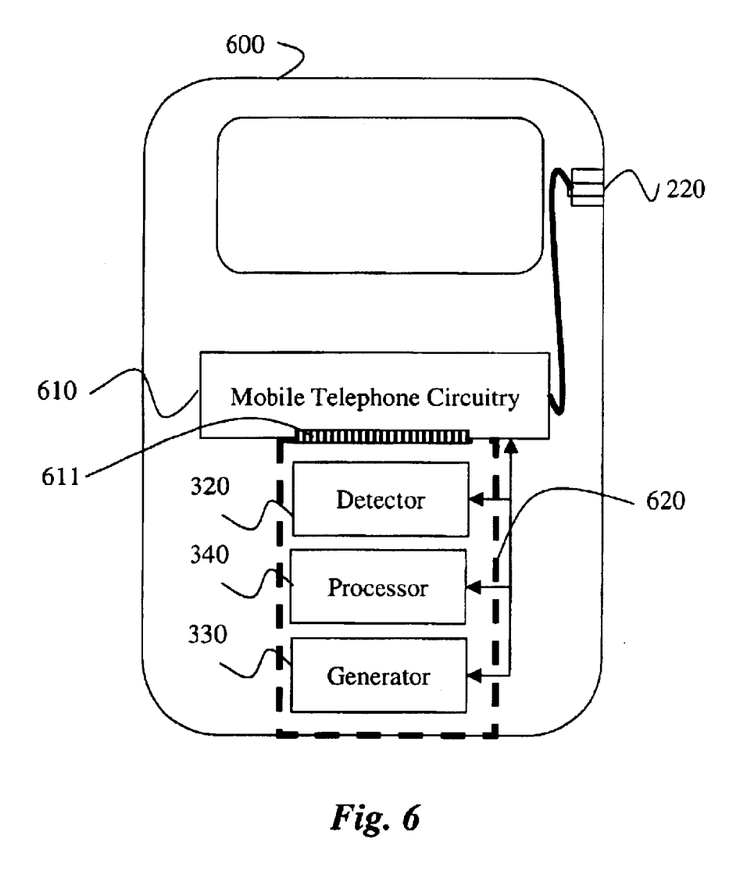
FIG. 6 is a block diagram with a personal identification device integrated into a mobile telephone according to the invention.

FIG. 6 shows a personal identification device 620 integrated into a mobile telephone 600. The device 620 includes the detector 320, the generator 330, and the processor 340. The device 620 is coupled to standard mobile telephone circuitry 610. The circuitry 610 is connected to the female jack 220 in a standard manner.

In this implementation, the device 620 can be in the form of a subscriber information module (SIM) also known a smart card. The SIM 620 connects to the circuitry 610 via pins 611.

The use of SIMs is a feature of the GSM air interface standard. The SIM is inserted into the mobile telephone to control its functionality as described above. The SIM holds all of a subscriber's personal information and phone settings. In essence, it is the subscriber's authorization to use the network. It also holds the phone number, personal security key and other data necessary for the mobile telephone to function. The SIM can be inserted in any mobile telephone, making a particular telephone receive all calls to the subscriber's number. It is well known in the art how the software in a SIM can be adapted to achieve a desired result. In this case, the firmware of the SIM implements the detector 320, the processor 340, and the generator 330.

It is also possible to incorporate part or all of the functionality of the personal identification device 300 into the mobile telephone circuitry 610. This can be accomplished through various techniques well known in the art. For example, the mobile telephone circuitry 610 may include all the hardware and software of a typical implementation of the personal identification device 300. Alternatively, the functionality of the personal identification device 300 can be realized entirely through software included in the mobile telephone circuitry 610.

Personal Identification Device for a Wireless Data Communicator

The embodiments above assume explicitly that the mobile telephone user places a voice telephone call. However similar steps and similar results can be obtained with a data telephone call. In that case, the PID is coupled to the phone's data port, and the simulated telephone activity is data or packet activity.

Figure 7:
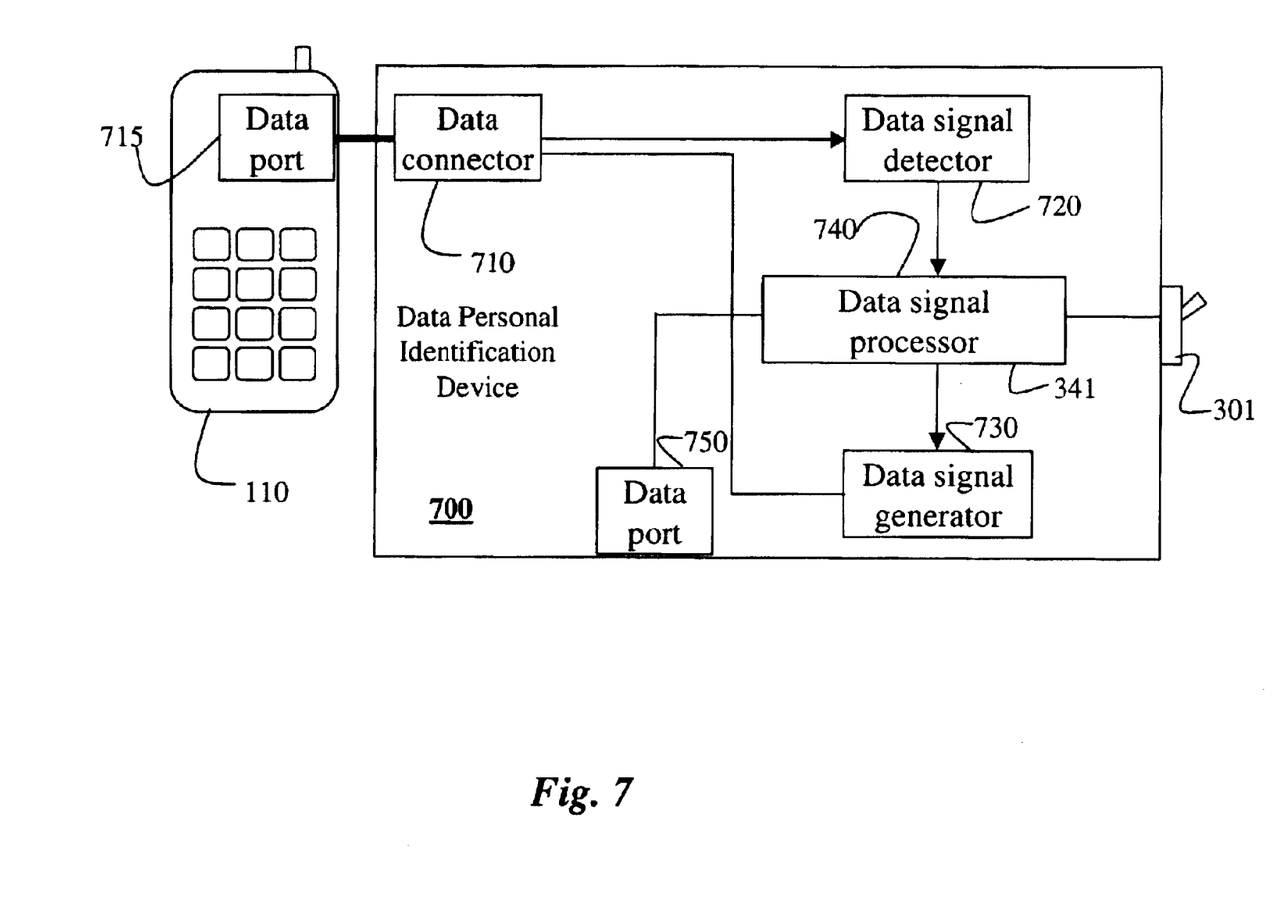
FIG. 7 is a block diagram of a personal identification device according to the invention using a data telephone signal.

FIG. 7 shows an embodiment of a data PID 700 equipped with a data connector 710 that mates into a data port 715 of a mobile telephone 110. The data PID 700 includes functional blocks similar to those of the audio PID 300. In particular, The data PID 700 includes a data telephone signal detector 720; a data telephone signal processor 740; and a data telephone signal generator 730. Each of the last three block may be a simple pass-through function. Like the audio PID 300, the data PID 700 can optionally include an encryption module 341 and a switch 301 to control the operation. For example, the switch can be used for disabling the functionality of the PID so that all data are passed without alteration to an optional data port 750.

As with the audio PID 300, the data telephone signal processor generates a data telephone signal wherein a message is conveyed by the pattern of activity. For example, a message can be conveyed by the pattern of packet transmissions. The pattern may include packet size and packet timing.

In such an embodiment, the invention is also applicable to data-only wireless terminals that do not have a voice capability. In other words, the messages are encoded in data signals. For example, the PID functionality can be realized by a software module in a portable computing device equipped with a wireless communicator.

Where the functionality of a PID is integrated into a mobile telephone, it is optionally possible to use different kinds of telephone signals in place of the audio signals used in the preferred embodiment. For example, it is well known in the art how a server in the wireless network can communicate a digital message to a SIM. For example, the server can modify the subscriber information in the SIM through such a digital message. Also, it is well known how the SIM can generate activity that results in a pattern of radio transmissions by the mobile telephone. For example, the SIM can generate subscriber registration activity, which results in a distinctive pattern of radio envelope transmission.

It is understood that, in alternative embodiments of this invention, the communication between the PID and the server 410 can occur through means other than an audio telephone signal, and that the simulated telephone activity can be any kind of simulated mobile telephone activity that results in a pattern of transmitted radio envelope.

Different models of wireless telephones have different kinds of connectors, other than a female jack, for a hands-free kit. It is obvious to those skilled in the art how to replace a jack with a different kind of connector while maintaining the functionality of the present invention.

Although the invention has been described by way of examples of preferred embodiments, it is to be understood that these and various other adaptations and modifications can be made within the spirit and scope of the invention. Therefore, it is the object of the appended claims to cover all such variations and modifications as come within the true spirit and scope of the invention.

We claim:

1. An apparatus for use with a mobile telephone in a wireless communications network, comprising:

a connector configured to connect to a mating connector of a mobile telephone; and a telephone signal processor, coupled to the connector, configured to receive a first message in a first telephone signal received via the mobile telephone, and to produce, in response to the first message, a second message in a second telephone signal for the mobile telephone, and wherein the first and second messages are simulated telephone activity that modulates an envelope of transmitted radio signals responsive to the simulated telephone activity.

2. The apparatus of claim 1 wherein the telephone signals are voice telephone signals and the connector is a voice jack.

3. The apparatus of claim 1 wherein the telephone signals are data telephone signals and the connector is a data jack.

4. The apparatus of claim 1 further comprising:

an audio signal detector coupled between the connector and an input of the telephone signal processor, configured to detect the first telephone signal.

5. The apparatus of claim 1 further comprising:

an auto signal generator, coupled between an output of the telephone signal processor and the connector, configured to generate the simulated telephone activity.

6. The apparatus of claim 4 further comprising:

an earpiece connected to the output of the audio signal detector.

7. The apparatus of claim 5 further comprising:

a microphone connected to an input of the audio signal generator.

8. The apparatus of claim 1 further comprising:

a server configured to generate the first message in response to a telephone call received from the mobile telephone via the wireless communications network.

9. The apparatus of claim 1 wherein the telephone signal processor is a pass-through module.

10. The apparatus of claim 1 wherein the audio signal processor further comprises:

means for decrypting the first message; and means for encrypting the second message.

11. The apparatus of claim 1 further comprising:

means for authenticating a user of the mobile telephone.

12. The apparatus of claim 1 further comprising:

a mobile telephone identifier configured to receive the second message via an uplink radio signal of the wireless communications network.

13. The apparatus of claim 12 wherein the mobile telephone identifier authorizes a commercial transaction initiated from the mobile telephone.

* * * * *